Figure 1:
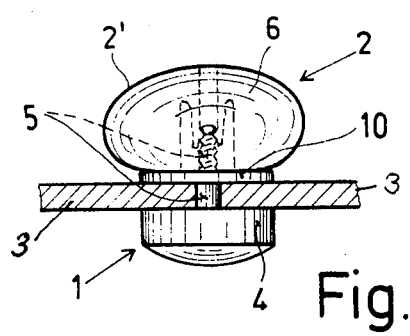

United States Patent [19]

Nitsche

[11] Patent Number: 4,723,421
[45] Date of Patent: Feb. 9, 1988

[54] EAR CLIP HAVING IMPROVED SECURING MEANS

[76] Inventor: Helmut Nitsche, Zingelistrasse, CH-6353 Weggis, Switzerland

[21] Appl. No.: 860,587
[22] Filed: May 7, 1986
[51] Int. Cl.$^4$ .................................................. A44C 7/00
[52] U.S. Cl. .......................................... 63/12; 24/108
[58] Field of Search ................ 63/12, 13; 24/108, 104

[56] References Cited

U.S. PATENT DOCUMENTS

| 198,149 | 12/1977 | Pitts | 24/108 |
|---|---|---|---|
| 822,011 | 5/1906 | O'Donnell | 24/104 |
| 1,336,243 | 4/1920 | Lee | 24/108 |
| 3,504,507 | 4/1970 | Ferro | 63/12 |
| 4,387,488 | 6/1983 | Kanzaka | 24/108 |
| 4,397,067 | 8/1983 | Rapseik | 63/12 |
| 4,481,696 | 11/1984 | Kanzaka | 24/108 |

FOREIGN PATENT DOCUMENTS 7811151  5/1980  Netherlands .......................... 24/108

*Primary Examiner*—Richard J. Johnson
*Attorney, Agent, or Firm*—Pollock, Vande Sande and Priddy

[57] ABSTRACT

A reliable, cheaply producible connection between two parts of an ornamental ear clip comprises an inserted and a receiving nut, the nut supporting a flexible flange adjacent an interior cavity in the nut in which a hollow shaft is present which is capable of elastic transverse movement and which has an engaging element that which engages a retaining element on the pin. The nut, hollow shaft, and engaging element consist of tough and resilient plastic and the flexible flange is a metallic ring that is attached to the nut.

4 Claims, 6 Drawing Figures

EAR CLIP HAVING IMPROVED SECURING MEANS

In securing means on articles having two parts detachably connected to one another, these parts are either inserted one into the other or screwed together. If the two parts are to interlock, for example in the case of an ornamental ear clip, one of the connecting parts must be solid; when this part consists of metal or a stone, the weight is considerable. Not only are the production costs high but the ornamental ear clip is uncomfortable to wear. Furthermore, tensile and lateral compressive forces which occur easily give rise to damage. In the case of small ear ornaments, the conventional pin is only about 1 mm thick while the receiving part is five to ten times larger and is also heavy, which restricts the load-bearing capacity.

The invention relates to an improved securing means for an ear clip having two parts detachably connected to one another. It is the object of the invention to provide a readily detachable, secure and cheap connection which absolutely excludes the effects of tensile and lateral compressive forces which occur during use, cause damage and promote unintentional separation.

Two embodiments are illustrated with reference to the drawing, in which

Figure 3:
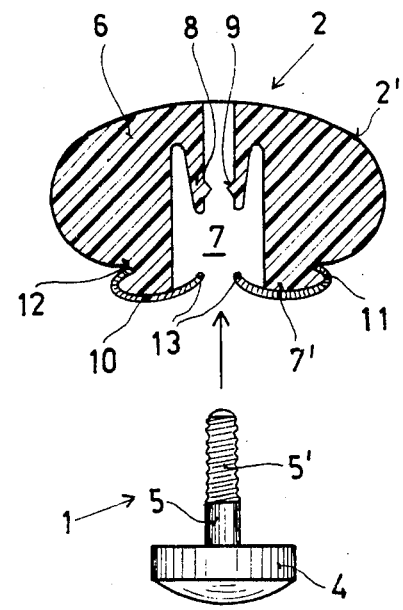
Figure 2:
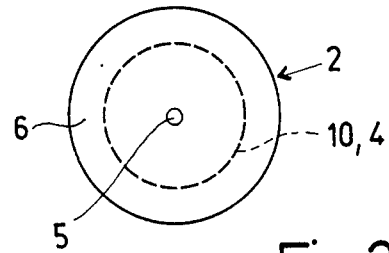
Figure 4:
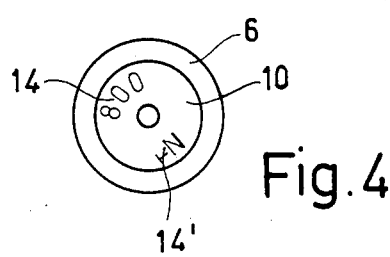
Figure 5:
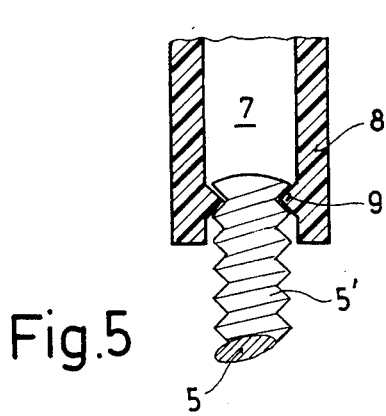
Figure 6:
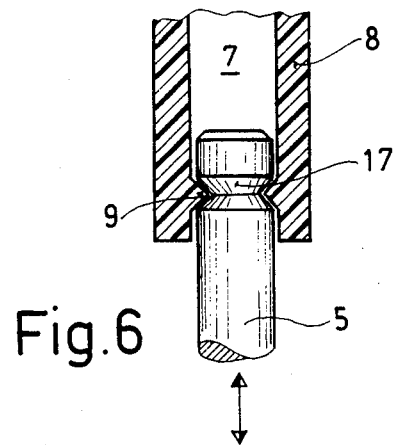

FIG. 1 shows a side view of the securing means on a support, in section, where the said support is part of an ear lobe, FIG. 2 shows a plan view, FIG. 3 shows, on a larger scale, a vertical section through the receiving part of the securing means and a view of the part which is intended to be inserted into this receiving part, FIG. 4 shows, on a smaller scale, a view from below onto the head of the inserted part, FIG. 5 shows, on a larger scale, a vertical section through a part of the threaded pin screwed into the hollow shaft, and FIG. 6 shows a variant of the embodiment according to FIG. 5.

Element 1 of an ear clip constructed in accordance with the present invention is a metal inserted part and element 2 denotes the receiving part which consists of tough and resilient plastic. The ear lobe 3, a part of which is shown (FIG. 1), is placed between the said two parts. The inserted part 1 consists of an ornamental head 4 and the threaded pin 5, which forms a locking element. In the case of an ear ornament, the threaded pin 5 is about 0.8 to 1.2 mm thick. The receiving part 2 consists of a flattened sperical unit 6 which has a partially curved surface 2'. The nut 6 fabricated of tough and resilient plastic which may be a high polymer compound, such as polystyrene or the like. In the central part, the nut 6 possesses a cylindrical cavity 7 which extends from the base 7' for about three-quarters of the height of the nut. A hollow shaft 8 projects into the cavity 7, the inside wall of the said shaft being provided with a pointed retaining rib 9 which is directed inward and engages the sharp-edged thread 5' on the threaded pin 5.

Within certain limits, the wall of the hollow shaft 8 possesses elastic mobility in the transverse direction since it is produced from resilient plastic. Mounted on the base 7' is an annular metal ring 10 whose outer edge has a bent-over hook-like part 11 which is directed upward, engages a groove 12 in the nut 6 and is fixed in the said groove. The inner portion of the metal ring 10 is provided with the flange 13 which is bent upward, partly projects into the cavity 7 of the hollow shaft 8 and is directed upward toward the hollow shaft 8. The flange 13 facilitates insertion of the threaded pin 5, in the correct position, into the hollow shaft 8; furthermore, this flange is springy and absorbs lateral compressive movements directed against the threaded pin 5.

Markings 14, 14', of which the first shows the usual gold or silver hallmarks and the latter indicates the manufacturer, are located on the lower surface of the metal ring as shown in FIG. 4.

Instead of a thread 5', the pin 5 may also be provided with a groove 17 as a retaining aid, into which the retaining rib 9 on the hollow shaft 8 fits to form a positive connection. See FIG. 6.

The securing means is particularly suitable for ear ornaments in which one of the parts is manufactured from a hard material and the other from plastic. Because of the resilience properties of the parts 8, 13 which engage the threaded pin 5, unintentional separation does not usually occur, even in the case of shocks. Lateral impacts on the parts 1, 2 are also cushioned and rendered harmless, partly by the action of the bent-over part 11 and the flange 13.

I claim:

1. An ornamental ear clip for attachment to the ear lobe of a wearer comprising a nut element adapted to be disposed adjacent one side of the wearer's ear lobe, an ornamental member adapted to be disposed adjacent the other side of the ear lobe, and a pin element extending from said ornamental member for passage through said ear lobe into said nut element from the other side of said ear lobe, said nut element being of flattened spherical configuration and having a cylindrical cavity therein which opens into an exterior surface of said nut element to define a substantially circular first opening in said surface, an annular ring of elastic material attached to said exterior surface of said nut element in surrounding relation to said first opening, the inner periphery of said annular ring being formed as a flexible flange which extends beyond the outer edges of said first opening and which is smoothly curved from said first opening into said cavity to partially close said first opening and to define a circular second opening within said cavity having a diameter less than the diameter of said circular first opening, the interior of said nut element including a resilient hollow shaft that is located within said cylindrical cavity in coaxial relation thereto, said hollow shaft having an outer diameter less than the diameter of said cylindrical cavity and being elastic in its transverse direction, said resilient hollow shaft extending toward said circular second opening and being shorter in length than said cylindrical cavity so as to terminate within said cavity in spaced relation to said flexible flange and said second opening, said resilient hollow shaft being adapted to receive said pin element via said circular second opening in said flexible flange, and the interior of said resilient hollow shaft including retaining means shaped for adjustable engagement with a complementarily shaped portion of said pin element that enters said hollow shaft via said second opening in said flexible flange.

2. The ornamental ear clip of claim 1 wherein said nut element and hollow shaft are each fabricated of a plastic material, and said annular ring is metallic.

3. The ornamental ear clip of claim 1 wherein said exterior surface of said nut element defines a groove that surrounds said first opening, the outer periphery of said annular ring being bent into said groove to retain said ring in place on said nut element.

4. The ornamental ear clip of claim 1 wherein said complementarily shaped portions of said pin element and hollow shaft comprise a thread configuration on said pin element which is adapted to engage a pointed rib that extends inwardly of the inner surface of said hollow shaft.

* * * * *